(12) United States Patent  (10) Patent No.: US 9,336,364 B1
Ho et al.  (45) Date of Patent: *May 10, 2016

(54) METHOD AND SYSTEM TO RECORD ONTO A MEDIA PLAYER

(71) Applicant: TP Lab, Inc., Palo Alto, CA (US)

(72) Inventors: Chi Fai Ho, Palo Alto, CA (US); Shin Cheung Simon Chiu, Palo Alto, CA (US)

(73) Assignee: TP LAB, INC., Palo Alto, CA (US)

( * ) Notice: Subject to any disclaimer, the term of this patent is extended or adjusted under 35 U.S.C. 154(b) by 143 days.

This patent is subject to a terminal disclaimer.

(21) Appl. No.: 14/242,929

(22) Filed: Apr. 2, 2014

Related U.S. Application Data

(63) Continuation of application No. 11/644,569, filed on Dec. 21, 2006, now Pat. No. 8,731,380.

(51) Int. Cl.
*H04N 5/92* (2006.01)
*G06F 21/10* (2013.01)

(52) U.S. Cl.
CPC ..................................... *G06F 21/10* (2013.01)

(58) Field of Classification Search
CPC .......... H04N 21/4621; H04N 21/4753; H04N 21/4627; H04N 21/8543; H04N 5/765
See application file for complete search history.

(56) References Cited

U.S. PATENT DOCUMENTS 7,840,769 B1  11/2010  Ho et al.
2008/0228848 A1*  9/2008  Takahashi ............ G11B 27/105
  709/201

* cited by examiner

*Primary Examiner* — Huy T Nguyen
(74) *Attorney, Agent, or Firm* — North Shore Patents, P.C.; Michele Liu Baillie

(57) ABSTRACT

A method and system for recording a media content onto a media player are disclosed. A recording interface of the media player is unlocked by a media recorder using a key. Next, the media player receives the media content from the media recorder through the recording interface. The media content is stored onto a storage of the media player, where the storage resides within the media player prior to receiving the media content from the media recorder. The media player includes a mechanism for playing the media content. Then, the recording interface of the media player is locked by the media recorder. In this manner, a way is provided to distribute media content while also protecting against the improper copying of media content.

22 Claims, 5 Drawing Sheets

METHOD AND SYSTEM TO RECORD ONTO A MEDIA PLAYER

CROSS-REFERENCE TO RELATED APPLICATIONS

This application is a continuation of co-pending U.S. patent application Ser. No. 11/644,569, filed on Dec. 21, 2006; which in turn is related to U.S. patent application Ser. No. 11/595,362, filed on Nov. 9, 2006, and issued as U.S. Pat. No. 7,840,769 on Nov. 23, 2010.

BACKGROUND OF THE INVENTION

1. Field

This invention relates generally to media, particularly to a system and method to record media content onto a media player.

2. Related Arts

Digitization of pictures, music and movies brings convenience to the entertainment and media industry. Digital media has proven to be a highly efficient and effective distribution mechanism. For example, digital music download, music ripping and music CD burning by consumers are common.

The ease of media distribution leads to major unintended business implications, especially in illegal copying of media content. Examples include illegal music download through peer-to-peer copying mechanisms like Napster™, or Kazaa™. Or more frequently, a consumer copies downloaded music in MP3 format to CD's and MP3 players. In one example, John is a high school student. He, on Tuesday, purchased and downloaded last week's top 10 pop songs. He burned a music CD for his desktop music system with the songs. In addition, he ripped the songs to his iPod™, his sisters' MP3 players, and his father's home media center. After John talked to his friends in the school, John copied the files to his classmates' MP3 players.

Several security mechanisms are being introduced to address the problem. They are mainly related to digital right management (DRM), where a signature is put into a media file, and a user is given a key. A media player would be able to play the media file only after the user presents the key. Often times, the key is given to the media player so that the media player can play the media file while other media players cannot play the media file. Although such security mechanisms partially solve the copying problem, they are very inconvenient to users. As in the above example, John downloaded to his PC the songs with DRM protection. In one embodiment, the key was given to John's PC. John was able to listen to the songs. After John ripped the songs to his iPod, he cannot play the songs with his iPod. Over a weekend, John's buys a new PC and transfers the songs to the new PC. John cannot play the songs on the new PC as the new PC does not have the key.

The above illustrates a need for a way to distribute media content and to protect against improper copying of media content, and therefore a need for a solution to record media content under protected condition.

BRIEF SUMMARY OF THE INVENTION

A method and system for recording a media content onto a media player are disclosed. A recording interface of the media player is unlocked by a media recorder using a key. Next, the media player receives the media content from the media recorder through the recording interface. The media content is stored onto a storage of the media player, where the storage resides within the media player prior to receiving the media content from the media recorder. The media player includes a mechanism for playing the media content. Then, the recording interface of the media player is locked by the media recorder. In this manner, a way is provided to distribute media content while also protecting against the improper copying of media content.

DETAILED DESCRIPTION OF THE INVENTION

Figure 1:
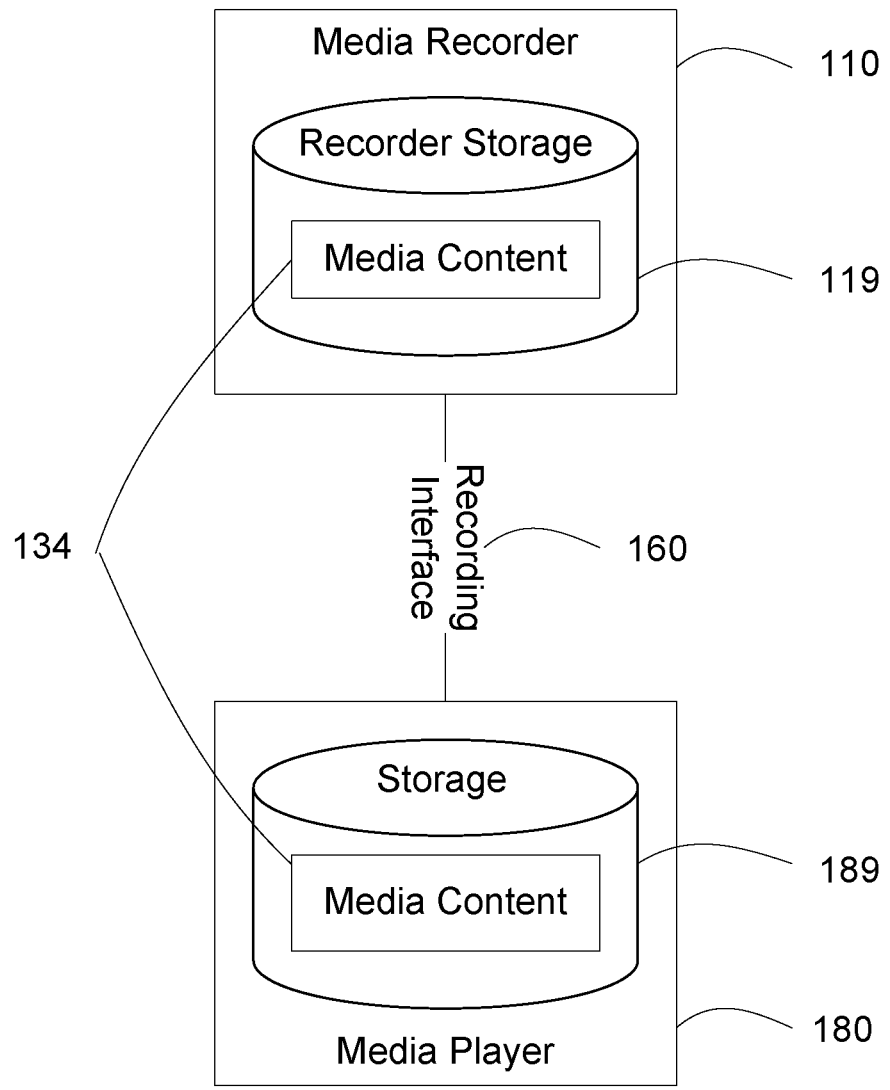
FIG. 1 illustrates a media recorder.

FIG. 1 illustrates a media recorder. Media recorder 110 records media content 134 onto media player 180 in a protected condition.

In one embodiment, media content 134 includes audio media content such as a song, an audio recording, a music concert recording, a talk show or an interview recording. In one embodiment, media content 134 includes a music album. In one embodiment, media content 134 includes a video media content such as a movie, a video recording such as a television program, a concert or a theatrical play recording, a music television (MTV), a short film, a cooking, exercise or self-improvement instructional program, a documentary, a comic performance, or a lecture recording. In one embodiment, media content 134 comprises a live concert, a studio recording session, a sports event, or a live interview. In one embodiment, media content 134 comprises a broadcast program, such as a television or radio program.

In one embodiment, media content 134 includes an audio media file such as a Moving Picture Experts Group-1 Audio Layer 3 (MP3) file, a Windows Media Audio (WMA) file, or an Advanced Audio Coding (AAC) file. In one embodiment, media content 134 includes a video/audio file such as a Windows Media Video File (WMV), a Moving Picture Experts Group-4 (MPEG-4) file or an Audio Video Interleave (AVI) file. In one embodiment, media content 134 includes a collection of media files.

Media player 180 includes a non-removable storage 189, such as flash memory or hard disk. Media recorder 110 records media content 134 onto storage 189. The storage 189 resides within the media player 180 prior to recording of the media content 134 onto storage 189. Media player 180 includes the functionality of playing media content 134. In one embodiment, media player 180 includes a speaker for playing audio media content in media content 134. In one embodiment, media player 180 includes a graphical display screen for playing video media content in media content 134. In one embodiment, media player 180 includes user control function, such as a plurality of keys that allow a user to control the playing of media content 134. In one embodiment, the user control function allows a user to select, skip, pause or resume audio media content; or to turn up/down the volume. In one embodiment, the user control function allows a user to select, rewind, or fast-forward video media content; or to adjust the contrast or color tone.

The media player 180 is described further in Appendix A. As described in Appendix A, media player 180 includes a mechanism for playing the media content 134.

In one embodiment, media player 180 allows media recorder 110 to record media content 134 only once.

Media recorder 110 communicates to media player 180 using a recording interface 160. Media recorder 110 records media content 134 onto media player 180 over recording interface 160. In one embodiment, recording interface 160 includes a data interface, such as a Universal Serial Bus (USB) interface. In one embodiment, recording interface 160 includes an audio jack, an RCA jack, a component video interface, a composite video interface, or an S-Video interface. In one embodiment, recording interface 160 includes a High-Definition Multimedia Interface (HDMI) interface, or a High-Bandwidth Digital Content Protection (HDCP) interface. In one embodiment, recording interface 160 includes a network interface, such as an Ethernet interface. In one embodiment, recording interface 160 includes a communication session between media recorder 110 and media player 180.

In one embodiment, recording interface 160 includes a mechanical lock which is unlocked during recording of media content 134.

In one embodiment, media recorder 110 includes recorder storage 119. Recorder storage 119 includes information that comprises media content 134. In one embodiment, recorder storage 119 includes media content 134. In one embodiment, recorder storage 119 includes flash memory or hard disk. In one embodiment, recorder storage 119 includes removable media such as a secure digital (SD) memory card, compact disk (CD) or DVD. In one embodiment, recorder storage 119 includes a USB based flash memory drive.

In one embodiment, media recorder 110 connects to one or more capturing devices such as microphone or video camera that capture audio or video signals in a live performance setting. Media recorder 110 processes or combines the signals into information that comprises media content 134.

In one embodiment, media recorder 110 includes a receiver, such as radio receiver or television receiver to receive a broadcast program.

Figure 2:
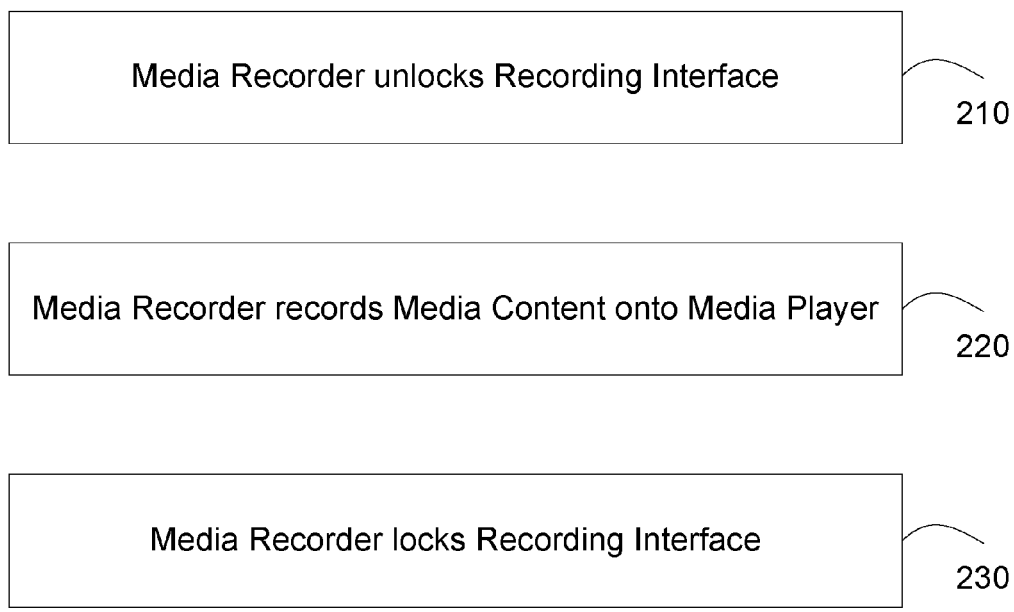
FIG. 2 illustrates a recording process.

FIG. 2 illustrates a recording process.

The recording process includes steps 210, 220, and 230.

Figure 3:
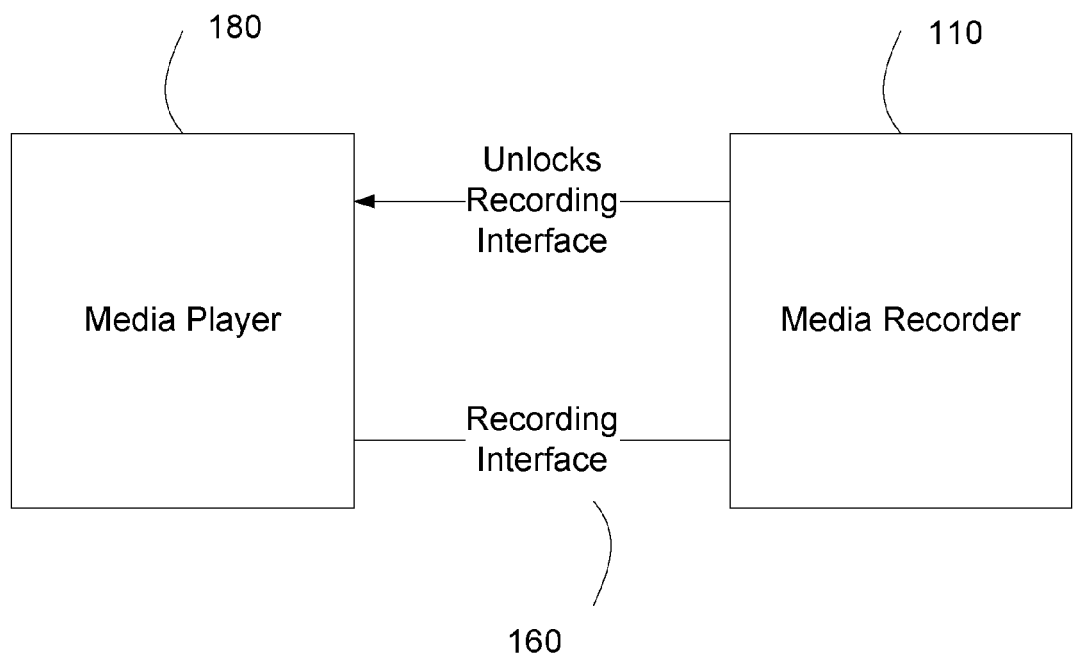
FIG. 3 illustrates the media recorder unlocking the recording interface.

In step 210 as illustrated in FIG. 3, media recorder 110 unlocks recording interface 160. In one embodiment, recording interface 160 includes a communication session. Media recorder 110 sends a recording request to media player 180 over the communication session, wherein the recording request includes an authentication identity such as a password or an alpha-numeric code. In one embodiment, media player 180 authenticates the identity, allows the media recorder 110 to connect to the recording interface 160, and proceeds to step 220. In a different embodiment, media recorder 110 uses a two-factor authentication (T-FA). In one embodiment, media recorder 110 includes an identity and an operator provides a personal identification number (PIN) to media recorder 110. Media recorder 110 includes the identity and the PIN in the recording request. In one embodiment, the operator provides biometric information to media recorder 110.

In one embodiment, media player 180 includes a mechanical lock and media recorder 110 includes a mechanical key. Media recorder 110 unlocks recording interface 160 by engaging the mechanical key with the mechanical lock. Media recorder 110 then connects to the recording interface 160 of the media player 180 and proceeds to step 220. In one embodiment, the mechanical lock includes an electromagnet; wherein the engagement of the key and the mechanical lock causes an electrical current to pass through the electromagnet, resulting in the connection of media recorder 110 and media player 180. In another embodiment, the mechanical lock includes a solenoid bolt. In one other embodiment, the mechanical lock includes a normally-open electrical relay that connects media recorder 110 and media player 180 when activated by an electrical current. In one embodiment, the mechanical lock includes an electric motor that moves a piece of conductor to connect media recorder 110 and media player 180. In one embodiment, the mechanical lock includes a spring-loaded latch. In one embodiment, in released or unloaded position, the latch closes the physical opening of recording interface 160. The engagement of the key and the mechanical lock loads the spring, causing the latch to open the physical opening of recording interface 160, allowing media recorder 110 to connect to media player 180.

In one embodiment, recording interface 160 includes a combination of a mechanical lock and a communication session. Media recorder 110 provides an authentication key or identity to media player 180. In one embodiment, media player 180 authenticates the authentication key or identity and allows media recorder 110 to establish a communication session with media player 180. Media recorder 110 proceeds to step 220.

Figure 4:
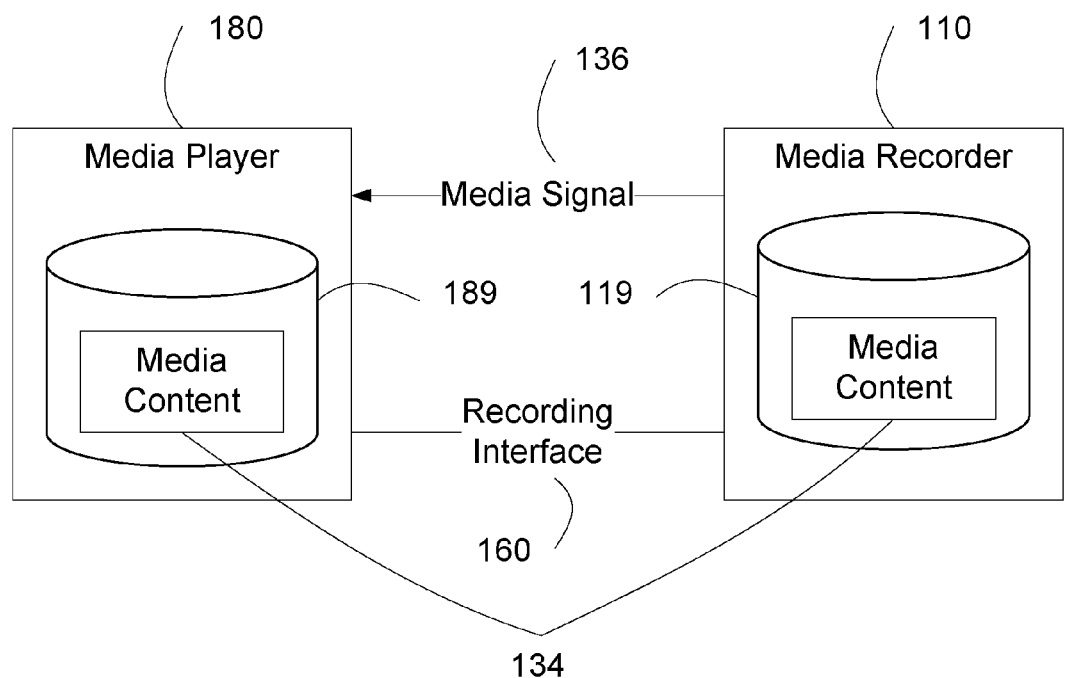
FIG. 4 illustrates the media recorder transferring a plurality of media signals to the media player using the recording interface.

In step 220 as illustrates in FIG. 4, media recorder 110 transfers a plurality of media signals 136 to media player 180 using recording interface 160. The plurality of media signals 136 comprises media content 134. In one embodiment, the plurality of media signals 136 are monophonic or stereophonic analog audio signals. In one embodiment, the plurality of media signals 136 are digital audio signals, such as Pulse Code Modulation (PCM) digital audio signals in 8 kHz 8-bit monophonic, 8 kHz 16-bit stereophonic, or 44.1 kHz 16-bit stereophonic format. In one embodiment, the plurality of media signals 136 are in a compressed codec format such as G723.1. In one embodiment, the plurality of media signals 136 are in MP3 frame format also known as MP3 digital format. In one embodiment, the plurality of media signals 136 are analog video signals in National Television System Committee (NTSC) or phase-alternating line (PAL) format. In one embodiment, the plurality of media signals 136 are digital video signals, such as MPEG-4, WMV or Society of Motion Picture and Television Engineers (SMPTE) format.

Media player 180 receives the plurality of media signals 136 and converts the plurality of media signals 136 into media content 134.

In one embodiment, media content 134 includes a computer file object. Media recorder 110 transfers media content 134 by performing a file transfer and media signals 136 includes portion of media content 134 file object.

After media recorder 110 completes step 220, media recorder 110 performs step 230.

Figure 5:
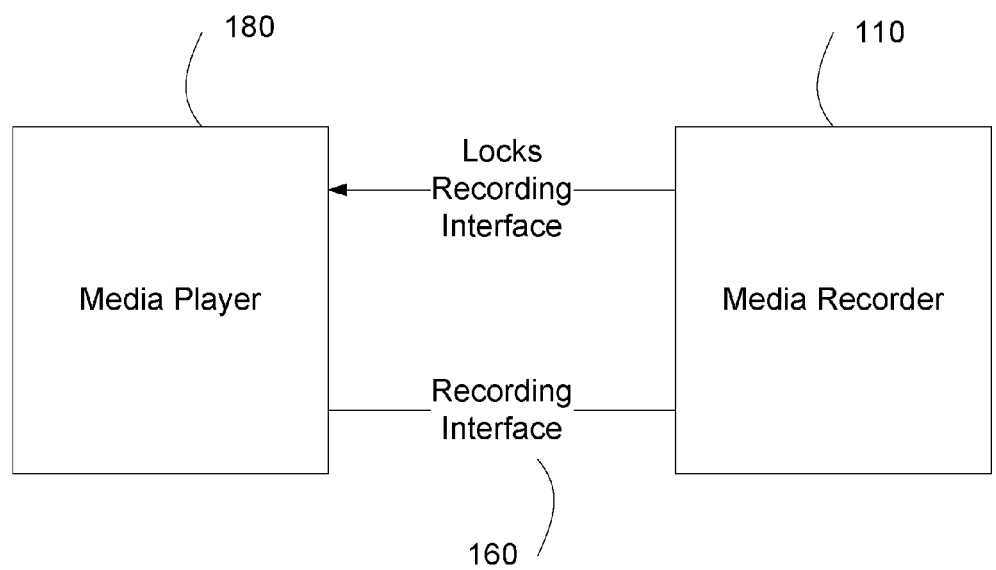
FIG. 5 illustrates the media recorder locking the recording interface.

In step 230 as illustrated in FIG. 5, media recorder 110 locks recording interface 160.

In one embodiment, media recorder 110 sends a lock request to media player 180 over the communication session. Media player 180 receives the lock request and disconnect media player 180 from media recorder 110. Media player 180 does not accept media signals 136 after the disconnection. In one embodiment, the lock request includes an authentication identity and media player 180 authenticates the identity before disconnecting media player 180 from media recorder 110.

In one embodiment, media recorder 110 locks recording interface 160 by disengaging the mechanical key from the mechanical lock. In one embodiment, the disengagement stops the electrical current that passes through the electromagnet of the mechanical lock, disconnecting media recorder 110 and media player 180. In one embodiment, the disengagement causes the normally-open electric relay to return to the open position resulting in the disconnection of media recorder 110 and media player 180. In one embodiment, the disengagement causes the spring-loaded latch to return to released or unloaded position that closes the physical opening of recording interface 160.

In one embodiment, the locking of recording interface 160 is permanent, wherein media player 180 does not respond to subsequent unlocking attempts from media recorder 110.

In one embodiment, media player 180 is for rental purpose. After a customer returns media player 180, in one embodiment, media recorder 110 records new media content 134 onto media player 180. In one embodiment, media recorder 110 uses a different key to record the new media content 134.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

What is claimed is:

1. A method for locking a media player, comprising:
   (a) connecting a media recorder with the media player over a hardware recording interface;
   (b) after connecting the media recorder and the media player over the hardware recording interface, sending a lock request to the media player by the media recorder; and
   (c) in response to the lock request, disconnecting the media recorder from the hardware recording interface by the media player, wherein the disconnecting causes permanent locking of the hardware recording interface, wherein the hardware recording interface does not respond to any subsequent unlocking attempts.

2. The method of claim 1, wherein the sending (b) comprises:
   (b1) storing a media content in a storage of the media player.

3. The method of claim 1, wherein the sending (b) comprises:
   (b1) prior to sending the lock request, connecting by the media recorder, one or more capturing devices for capturing media content.

4. The method of claim 3, wherein the connecting (b1) further comprises:
   (b1i) capturing the media content by the media recorder using the one or more capturing devices; and
   (b1ii) storing the captured media content in a storage of the media player.

5. The method of claim 4, wherein the one or more capturing devices comprises one or more of the following: a microphone; a video camera; and a broadcast receiver.

6. The method of claim 1, wherein the media player comprises a mechanical lock engaged with a mechanical key, wherein the disconnecting (c) comprises:
   (c1) in response to the lock request, disengaging the mechanical key from the mechanical lock of the media player.

7. The method of claim 6, wherein the mechanical lock comprises one or more of the following: an electromagnet; a solenoid bolt; an electrical relay; an electronic motor; and a spring-loaded latch.

8. The method of claim 6, wherein the hardware recording interface comprises a combination of the mechanical key and a communication session between the media recorder and the media player.

9. A media recorder, comprising:
   a key engaged with a mechanical lock of a media player, wherein the media recorder connects with the media player over a hardware recording interface,
   wherein after the key is engaged with the mechanical lock, the media recorder sends a lock request to the media player,
   wherein in response to the lock request, the key is disengaged from the mechanical lock, wherein the disengagement causes a permanent locking of the hardware recording interface, wherein the hardware recording interface does not respond to any subsequent unlocking attempts.

10. The media recorder of claim 9, wherein the media player comprises a storage, wherein the media recorder stores a media content in the storage of the media player.

11. The media recorder of claim 9, wherein prior to sending the lock request, the media recorder is coupled to one or more capturing devices for capturing media content.

12. The media recorder of claim 11, wherein the media recorder captures the media content using the one or more capturing devices and stores the captured media content in a storage of the media player.

13. The media recorder of claim 9, wherein the mechanical lock comprises one or more of the following: an electromagnet; a solenoid bolt; an electrical relay; an electronic motor; and a spring-loaded latch.

14. The media recorder of claim 9, wherein the hardware recording interface comprises a combination of the key and a communication session between the media recorder and the media player.

15. A system, comprising:
   a media player comprising a mechanical lock and a hardware recording interface; and
   a media recorder comprising a key for engaging the mechanical lock and connecting with the media player over the hardware recording interface,
   wherein after connecting the media recorder and the media player over the hardware recording interface, the media recorder sends a lock request to the media player,
   wherein in response to the lock request, the media player disconnects the media recorder from the hardware recoding interface, wherein the disconnecting causes permanent locking of the hardware recording interface, wherein the hardware recording interface does not respond to any subsequent unlocking attempts.

16. The system of claim 15, wherein the media player further comprises a storage, wherein the media recorder stores a media content in the storage of the media player.

17. The system of claim 15, wherein prior to sending the lock request, the media recorder connects to one or more capturing devices for capturing media content.

18. The system of claim 17, wherein the media recorder captures the media content using the one or more capturing devices and stores the captured media content in a storage of the media player.

19. The system of claim 18, wherein the one or more capturing devices comprises one or more of the following: a microphone; a video camera; and a broadcast receiver.

20. The system of claim 15, wherein the media player comprises a mechanical lock engaged with a mechanical key of the media recorder, wherein in response to the lock request, the media player disengages the mechanical key from the mechanical lock.

21. The system of claim 20, wherein the mechanical lock comprises one or more of the following: an electromagnet; a solenoid bolt; an electrical relay; an electronic motor; and a spring-loaded latch.

22. The system of claim 20, wherein the hardware recording interface comprises a combination of the mechanical key and a communication session between the media recorder and the media player.

* * * * *